Patented Apr. 18, 1939

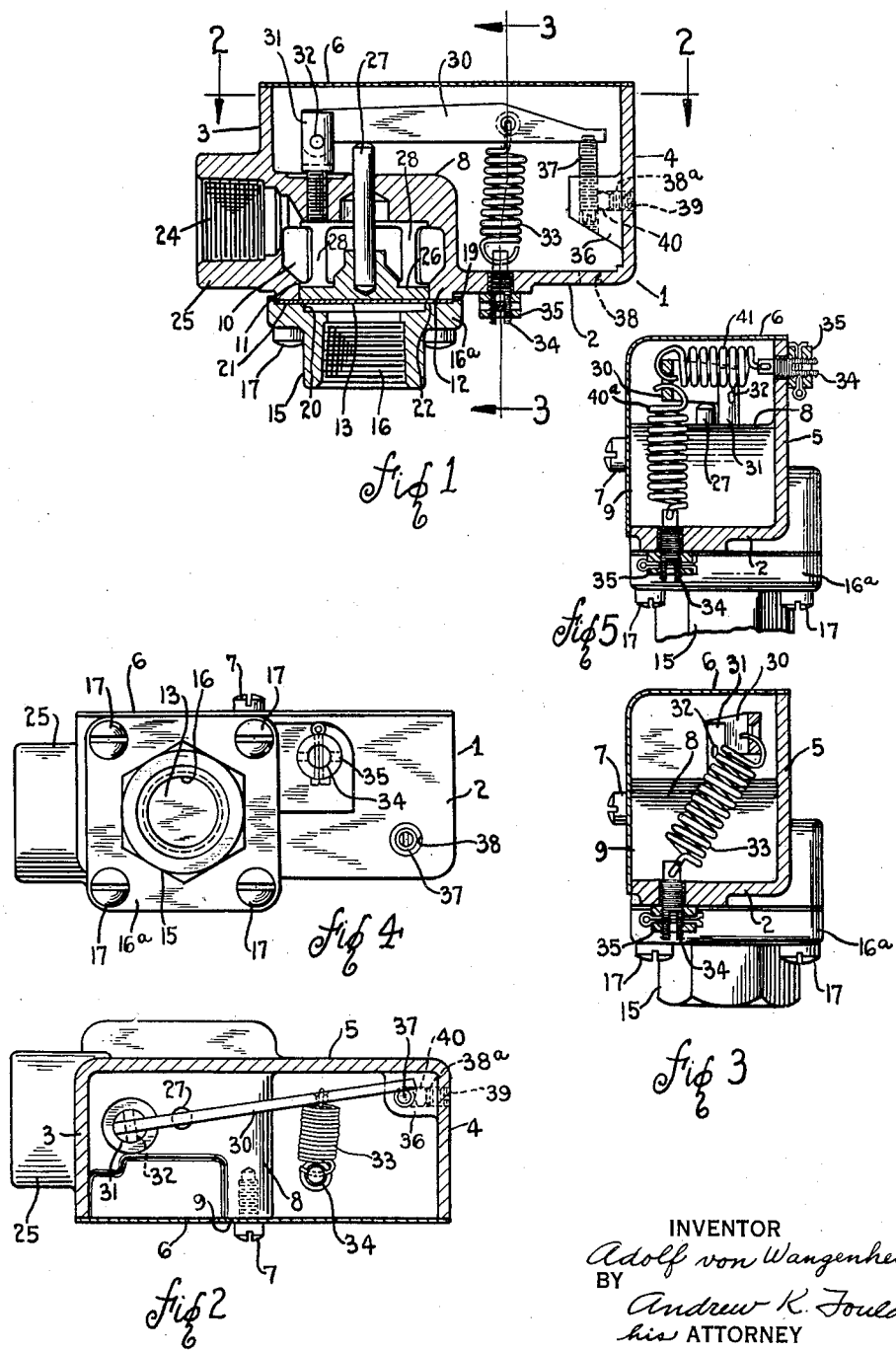

2,154,827

UNITED STATES PATENT OFFICE 2,154,827

PRESSURE RELIEF DEVICE

Adolf von Wangenheim, Detroit, Mich., assignor to Detroit Lubricator Company, Detroit, Mich., a corporation of Michigan Application October 17, 1935, Serial No. 45,423

17 Claims. (Cl. 137—53)

My invention relates generally to fluid containing systems and more particularly to pressure relief devices therefor.

One of the objects of my invention is to provide a pressure relief device of the type having a frangible diaphragm adapted to rupture to relieve pressure and to provide new and improved pressure operated mechanism for controlling rupture of the diaphragm.

Another object of my invention is to provide a pressure relief device having a new and improved arrangement of the operating parts thereof.

Another object of my invention is to provide a new and improved pressure relief device of the type having a frangible diaphragm against which pressure acts and to provide a device of this character which has a close differential between initial movement of the diaphragm and its relieving point.

The invention consists in the improved construction and combination of parts to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view shown in cross section of my pressure relief device;

Fig. 2 is a top plan view taken along the line 2—2 of Fig. 1;

Fig. 3 is a view shown in cross section taken along the line 3—3 of Fig. 1;

Fig. 4 is a bottom plan view of Fig. 1, and

Fig. 5 is a view similar to Fig. 3 and showing a modified form of my pressure relief device.

Referring to the drawing by characters of reference, the numeral 1 designates a supporting member or casing which is preferably a casting of rectangular form having a bottom wall 2, end walls 3 and 4, and a side wall 5. The other side wall and the top wall of the casing 1 are preferably formed by a removable closure member or cover 6 which may be constructed of sheet metal and be attached to the casing by means of a single screw 7, or be attached in any other suitable manner. In this instance the bottom wall 2, substantially intermediate end walls 3, 4, has an upwardly extending portion or step 8. The step 8 preferably joins and is integral with end wall 3 and side wall 5, and has a wall 9 flush with the inner side wall of cover 6 and into which the screw 7 may be threaded to attach the cover.

In the portion 8 there is provided a passage or chamber 10 and leading into chamber 10, through the bottom wall 2, there is an inlet opening or port 11 which is preferably defined by a downwardly extending tubular boss 12. A diaphragm 13 is provided for closing and sealing the opening or passage 11, leading into chamber 10, and a border portion around its periphery seats on the lower end of the tubular boss 12. Preferably the diaphragm 13 is constructed of a frangible material such as substantially pure tin, tin being preferable because of its other desirable qualities, namely its non-corrosiveness and its ductility, the latter quality permitting repeated contortions of a slight character of the diaphragm without its rupturing. Clamping the diaphragm 13 to the boss 12 there is a detachable clamping and connecting member 15. The clamping member 15 is tubular in form having a passage 16 therethrough which aligns with the diaphragm 13 and opening 11. The clamping member 15 has an external flange 16a provided with apertures for receiving screws 17 by means of which the diaphragm may be tightly clamped against the end of boss 12.

Preferably the upper end of the clamping member 15 is recessed, as at 19, for receiving the diaphragm 13 and also so that the member 15 telescopes over an end portion of the tubular boss 12. The upper end of the clamping member 15 is also preferably further recessed, as at 20, the recess 20 preferably being concentric with diaphragm 13 with the inner side wall defining the recess 20 being of less diameter than the opening 11. Thus an inner border portion of recessed wall 19, around its entire periphery, provides an upwardly facing shoulder or seating surface 22, the purpose of which is hereafter described. The tubular clamping member 15 may be internally threaded for connection in a fluid line or to a fluid containing receptacle such as a boiler, the pressure of the fluid thus acting against the frangible diaphragm 13. Leading out of chamber 10 there is an outlet passage 24 through end wall 3 and preferably the passage 24 is defined by an externally extending tubular boss 25 formed integral with wall 3. The tubular boss 25 may be internally threaded for connection with a drain or return line, as desired.

Disposed in chamber 10 there is a movable backing member for the diaphragm 13 and which includes a plate-like member 26 which normally seats on the annular shoulder 22. The lower face of the plate member 26 thus engages the upper side of the diaphragm 13 and preferably the plate 26 is circular in form and has a sliding fit with the inner side wall defining the opening 11. It will thus be apparent that the plate member 26 also serves as a valve disc, closing the opening 11 and only permitting full egress of fluid into chamber 10 upon movement of member 26 completely out of port or aperture 11. The diaphragm 13, constructed of non-corrosive material and disposed between the valve member 26 and the fluid, prevents the valve member from corroding and thus eliminates sticking of the valve member which would otherwise occur. The backing member, or valve, also includes a stem portion 27 which is rigidly fixed at one end to the plate 26 and extends upwardly therefrom. The stem 27 extends through an aperture in the stepped wall 8 and is guided therein, an upper portion of the stem 27 extending above the upper face of the stepped wall 8. Preferably the valve member or plate 26, as well as its stem 27, is guided in its movement to insure its proper alignment with valve port 11 and to insure its free movement therein. In the present instance, the member 26 is guided by a plurality of vertically extending ribs 29 formed on the inner wall of chamber 10 and extending from the bottom wall of the casing substantially to the inner face of the wall or step 8. The ribs 29 may be arranged in spaced relation surrounding the valve member 26, with their inwardly extending faces preferably being shaped to conform to the outer contour of member 26.

In order to provide an efficient pressure relief device and one which has a close differential between initial movement of the diaphragm and its relieving point, I provide pressure actuated mechanism which includes a force transmitting means in the form of a lever 30. The lever 30 is fulcrumed within the casing 1 and is disposed immediately above the upper end of the stem 27. The lever 30 is preferably constructed of flat, plate-like material or sheet metal and is arranged so that its lower edge normally bears on the upper end of the stem 27, the upper end of the stem preferably being rounded to reduce friction between the parts. The lever 30 preferably extends substantially from end wall 3 to end wall 4 in order to obtain good leverage. Supported in the stepped wall 8, between the end wall 3 and stem 27, there is a removable supporting member 31 to which one end of the lever 30 is pivoted, the supporting member preferably being located intermediate the side wall 5 and the side wall of cover 6. The supporting member 31 is preferably disposed adjacent the stem 27 so as to obtain a relatively short lever arm between the supporting member and stem, as compared to the lever arm between the stem and the other end of the lever. The supporting member 31 preferably has its upper end portion bifurcated to receive the lever, the lever and bifurcated end of the supporting member being provided with aligning apertures to receive a pin 32. The supporting member 31 is also freely rotatable and preferably its lower end portion is threaded for screw-threading into the stepped wall 8, the threaded engagement, however, being sufficiently free or loose to permit substantially frictionless swiveling of the member 31.

To establish the pressure at which the frangible diaphragm is to be permitted to rupture, and at which the valve or backing member 26 is to be moved out of port 11 to relieve the pressure in inlet 16, I provide spring means 33 for exerting a force, through the lever and against the valve or backing member, for opposing rupture of the diaphragm and movement of the valve member by forces less than the force exerted by the spring means. In the present instance, the spring means consists of a single spring, preferably of the coil or helical type, the spring being disposed in the casing at one side of the diaphragm and backing member. The spring 33 has one end connected to the lever 30, preferably at a point adjacent the free end of the lever so as to have a relatively long lever arm from the point of attachment of the spring to the lever, to the point of engagement of the lever and the stem 27. The lower end of spring 33 is preferably anchored to the bottom wall 2 of the casing, and preferably the lower end of the spring is attached to an adjustable member or pin 34 so that the tension of the spring, and therefore the pressure at which the diaphragm will rupture, can be varied. The bottom wall 2 is provided with an aperture therethrough for receiving the pin 34, the aperture having a bore of sufficiently large diameter to slidably receive the pin. The lower end of the pin 34 projects externally of the casing and is threaded to receive an adjustment or stop nut 35, which nut abuts the underside of the bottom wall 2 to hold the spring 33 under tension. Preferably the nut 35 is provided with a number of apertures and the pin 34 is provided with a slot for receiving a cotter pin, or the like, to prevent rotation of the nut relative to pin 34 after spring 33 is placed under the desired tension. Preferably the spring 33 is anchored to the bottom wall 2 at a point adjacent the side wall of cover 6 so that the lever is acted upon by components of the spring force, for a purpose to be hereafter described.

Integral with the end wall 4 and side wall 5, and disposed at the junction or in the corner formed by these walls, there is a boss 36 which extends into the casing for supporting an adjustable stop or latch member 37 which is preferably a screw or threaded pin. The boss 36 is disposed intermediate the top and bottom wall of the casing and has a vertically extending threaded bore which opens through its upper and lower ends and in which the screw 37 is threaded. In the bottom wall 2 there is provided an aperture 38 which registers with the threaded bore and threaded pin 37 is provided, in its lower end, with a slot for receiving a tool which may be inserted through aperture 38 for adjusting the vertical position of the stop pin 37. As is more clearly shown in Fig. 2, when the device is set for operation the lever 30 is disposed at an angle to the side wall 5, with its free end extending between side wall 5 and the stop pin 37, the lever being held against the pin 37 by spring 33. Extending through the side wall 4 there is a bore 38a which intersects the bore of pin 37, the bore 38a being provided to receive a locking screw 39 for preventing rotation of stop pin 37 after it is set. Between the inner end of screw 39 and the stop pin 37 there is preferably provided a piece of soft metallic material such as lead, indicated at 40, for frictional engagement with screw 39 so that the threads thereof will not be injured. As shown in Fig. 1, the stop screw 37 is preferably set so that only a small portion of its upper end extends above the lower edge of the lever 30.

As shown in Fig. 3, the spring 33 is disposed at an angle relative to the vertical and horizontal planes in which the lever 30 is adapted to move. The spring 33 thus exerts a force having two components, the vertical component of the force tending to pivot lever 30 downwardly and the horizontal component tending to swivel the lever in a horizontal plane. As shown in Fig. 2, the spring 33 is also preferably disposed with its longitudinal centerline substantially defining a chord of a circle having pin 31 as its center, so as to get maximum throw or swing of lever 30 upon its release.

The operation of my pressure relief device is as follows: The pressure at which the device will operate to relieve the pressure is determined by the force exerted by spring 33, opposing movement of valve member 26, and by the position of the upper end of the adjustable latch member 37 with respect to the lower edge of the lever 30. When the force acting against the frangible diaphragm 13 and the movable backing plate, or valve 26, exceeds the opposing force exerted by the spring 33, the valve member 26 begins to move upwardly or away from its seat 22. Upward movement of the valve member 26 is transmitted to the lever 30 by the stem 27 and if the upward movement is sufficient so that the free end of the lever is raised above the upper end of the latch member 37, then the horizontal component of the spring force becomes effective to pivot or swivel the lever 30 in a horizontal plane. After the lever 30 is moved horizontally a predetermined distance, it moves out of aligning engagement with the valve stem 27 and when this occurs the valve member will be instantly thrust upwardly by the fluid pressure, which pressure will, of course, rupture the frangible diaphragm. The pressure is thus relieved and the fluid may pass through chamber 10 and out of the outlet 24 thereof. After operation of the device, the clamping member 15 may be readily removed and a new diaphragm inserted in its recessed wall and be clamped in place by the screws 17. The pressure actuated mechanism of the device is then reset by swinging the free end of lever 30 over to its latch 37 and raising the free end of the lever to position it on the opposite side of latch 37. The spring 33 is thus placed under tension and holds the lever 30 against the latch 37.

By providing a force transmitting means such as the lever 30, and arranging the same so that it will be actuated to disengage from the valve at a predetermined pressure, it will be seen that the opposing force of the spring 33 is rendered instantly and entirely ineffective in opposing movement of the valve member when such disengagement occurs. As a result, the valve member is free to be moved away from its seat by the fluid pressure to instantly open the valve port to its maximum capacity for relieving the pressure. Also, by providing the lever 30 with a relatively short lever arm from its fulcrum to the valve stem 27, as compared to the length of the lever arm from the stem 27 to the latch 37, it will be understood that slight upward movement of stem 27 will result in the free end of the lever being moved through a relatively large arc. As a result, relatively small movement of the valve will be sufficient to cause the lever 30 to be disengaged from the valve stem 27 and because of this, the device can be set to safely operate at a pressure relatively close to the predetermined danger pressure. This prevents unnecessary operation of the pressure relief device at pressures which approach, but do not reach, the danger pressure and which may be caused by so-called hammer knock.

To construct a practical and satisfactory device of the above described character, the length of the lever arms of lever 30 may be made such that the ratio between the lever movement at the valve stem 27 and the latch 37 is approximately 5.7 to 1. Also, the latch may be adjusted so that its upper end projects .020 of an inch above the lower edge of the lever 30 when the same is in latched position. The ratio of 5.7 to 1 allows a movement of the valve of approximately .0035 of an inch before the free end of the lever is moved .020 of an inch or becomes unlatched. The above figures provide for approximately a five pound pressure increase between initial movement of the valve and unlatching of the lever. If desired, or found necessary under certain conditions, the latch 37 may be raised, for example, so that its upper end extends .040 of an inch above the lower edge of the lever when in latched position. In this position of the latch the pressure increase, between the initial movement of the valve and the point at which the lever becomes unlatched, will be about ten pounds pressure. Because of the ductility of the diaphragm 13 and the arrangement whereby the lever 30 and valve become disengaged, it will be seen that the diaphragm will not rupture until substantially the exact pressure has been reached for which the device is set to operate. That is to say, although there may be slight movement of the valve at pressures approximating the operating pressure, the lever 30 will not be swung out of engagement with the stem 27 until its free end has cleared the top of the latch member 37.

The construction and operation of the pressure relief device shown in Fig. 5 is similar to the above described device but differs therefrom in that two springs 40ª and 41 are employed, instead of a single spring. The spring 40ª is arranged with its longitudinal axis vertically disposed and has one end connected to the lever 30 and the other anchored to the bottom wall 2 of the casing. The spring 40ª thus acts solely to oppose movement of the valve member. The spring 41 is arranged with its longitudinal axis horizontally disposed with one end connected to the lever 30 and the other end anchored to the side wall 5 of the casing. The spring 41 thus acts solely to move the lever 30 out of engagement with the valve stem 27 when the free end of the lever is moved above the latch 37.

What I claim and desire to secure by Letters Patent of the United States is:

1. A pressure relief device comprising a supporting member having an opening therein, a frangible diaphragm held at its periphery to said supporting member and sealing said opening, said diaphragm being exposed to pressure acting on one side thereof, a backing member disposed on the other side of said diaphragm and movable relative thereto, a lever member normally engaging said backing member, a single spring exerting a force acting through said lever member to oppose movement of said backing member and also acting upon predetermined movement thereof to disengage said lever member from said backing member so that the frangible diaphragm can rupture to relieve the pressure, and latch means cooperable with said lever member to prevent disengagement of said lever member and said backing member at pressures below a predetermined pressure.

2. In a pressure relief device for relieving the pressure in a fluid receptacle having an outlet, a frangible diaphragm sealing said outlet and against one side of which the pressure acts, a movable backing member for said diaphragm and disposed on the other side thereof, a lever member normally engaging said backing member and movable for disengagement therefrom, spring means acting through said lever member to oppose movement of said backing member and also acting upon predetermined movement of said backing member by said pressure to move said lever member out of engagement therewith so that said diaphragm can rupture to relieve the pressure, and latch means acting to prevent disengagement of said lever member and said backing member at pressures below a predetermined pressure.

3. In a pressure relief device for relieving pressure in a fluid receptacle having an opening therein, a frangible diaphragm sealing said opening and against one side of which pressure acts, a movable backing member for said diaphragm and disposed on the other side thereof, said backing member being movable relative to said diaphragm, a lever engaging said backing member, said lever having a fulcrum and being movable about its fulcrum to urge said backing member toward said diaphragm, said lever also being laterally movable for disengagement from said backing member so that said diaphragm will rupture to relieve the pressure, spring means acting through said lever to oppose movement of said backing member and also acting to move said lever out of engagement with said backing member, and means preventing lateral movement of said lever at pressures below a predetermined pressure.

4. In a pressure relief device having a passage sealed by a frangible diaphragm and a movable backing member therefor, a lever member normally engaging said backing member for urging the latter toward said diaphragm, said lever member being fulcrumed for movement in the direction of movement of said backing member and also being movable laterally thereto for disengagement from said backing member, a coil spring exerting a force on said lever member and acting to oppose movement of said backing member and also acting to move said lever member out of engagement with said backing member, and means preventing lateral movement of said lever member at pressures below a predetermined pressure.

5. A pressure relief device comprising a casing having a passage therethrough, a frangible diaphragm sealing said passage and against one side of which pressure acts, a movable backing member for said diaphragm and disposed on the other side thereof, yieldable means disposed in said casing exteriorly of said passage, said yieldable means being disposed at one side of said diaphragm and exerting a force opposing movement of said backing member, movable connecting means operatively connecting said yieldable means and said backing member and movable by said yieldable means upon occurrence of a predetermined pressure for disconnecting said backing member and said yieldable means whereby said diaphragm will rupture to relieve the pressure, and means for preventing disengagement of said backing member and said connecting means at pressures below a predetermined pressure.

6. A pressure relief device comprising a casing having a passage therein, a frangible diaphragm closing and sealing said passage and against one side of which pressure acts, a movable backing member for the diaphragm and disposed on the other side thereof, said backing member having a stem member extending upwardly therefrom, a lever fulcrumed in said casing and normally engaging the upper end of said stem, said lever being movable laterally to and out of engagement with said stem so that the backing member can move and the diaphragm rupture to relieve the pressure, means exerting a force through said lever to urge said backing plate downwardly against movement by the fluid pressure and also acting to move said lever out of engagement with said stem upon predetermined upward movement of said lever by the pressure, and stop means cooperable with said lever to prevent lateral movement of said lever at pressures below a predetermined pressure.

7. A pressure relief device comprising a casing having a passage therethrough, a frangible diaphragm sealing said passage and against one side of which pressure acts, a movable backing member for said diaphragm and disposed on the other side thereof, a lever member engaging said backing member, said lever member being movable in the direction of movement of said backing member and also being movable laterally thereto for disengagement from said backing member, a coil spring disposed with its longitudinal axis angularly disposed relative to the planes of movement of said lever member whereby a component of the spring force acts to move said lever member against said backing member and another component of the force acts to move said lever member out of engagement with said backing member, and stop means engaging said lever member to prevent lateral movement thereof at pressures below a predetermined pressure.

8. A pressure relief device comprising a casing having a passage therein for fluid, a movable valve member for closing said passage and against one side of which the fluid pressure acts, a frangible diaphragm of non-corrosive material disposed between said one side of said valve member and the fluid to prevent corroding of said valve member, said frangible diaphragm being reenforced by said valve member, a lever member normally engaging said valve member and being movable for disengagement from said valve member, yieldable means acting through said lever member for opposing movement of said valve member, means operable upon increase in pressure to a predetermined pressure for moving said lever member to disengage the same from said valve member, and latch means for preventing movement of said lever member by said last-named means at pressures below a predetermined pressure.

9. A pressure relief device comprising a casing having a passage therein for the passage of fluid, a movable valve member for closing said passage and against one side of which the fluid pressure acts, a lever member fulcrumed in said casing and normally engaging said valve member, means exerting a force acting through said lever member to hold said valve member in closed position, said lever member also being supported to swivel and disengage from said valve member to render said force ineffective, means for moving said lever member for disengagement from said valve member upon increase in pressure acting thereagainst to a predetermined pressure, and means for preventing swivel movement of said lever member at pressures below a predetermined pressure.

10. In a pressure relief device, a supporting member having an opening therein, a movable closure member for closing said opening and against which fluid pressure acts tending to move said closure member to an open position, a lever member having operative connection with said closure member for transmitting a force to hold said closure member in closed position, said lever member being fulcrumed for pivotal movement in the direction of movement of said closure member and also being pivotal in a lateral direction relative to said closure member so that said closure member can move to said open position, yieldable means acting through said lever member to hold said closure member in closed position and also acting to move said lever member in said lateral direction, and stop means cooperable with said lever member to prevent lateral movement of said lever member at pressures below a predetermined pressure.

11. In a pressure relief device, a supporting member having an opening therein, a movable closure member for closing said opening and against which fluid pressure acts to move said closure member to an open position, a lever member for transmitting a force to hold said closure member in closed position and mounted for pivotal movement in substantially the same direction as the direction of movement of said closure member, said lever member also being mounted to swivel in a direction substantially lateral to the direction of movement of said closure member to move out of holding relation with said closure member, a stop member fixed relative to said lever member for preventing swivel movement of said lever member at pressures below a predetermined pressure, said stop member normally engaging said lever member with disengagement therebetween being effected upon pivotal movement of said level member in one direction through a predetermined angle, and yieldable means opposing pivotal movement of said lever member in said one direction and acting through said lever member to hold said closure member in closed position, said yieldable means also being operable to swivel said lever member upon movement of said lever member through said predetermined angle.

12. In a pressure relief device, a supporting member having an opening therein, a movable closure member for closing said opening and against which fluid pressure acts to move said closure member to an open position, a lever member for transmitting a force to hold said closure member in closed position and mounted for pivotal movement in substantially the same direction as the direction of movement of said closure member, said lever member also being mounted to swivel in a direction substantially lateral to the direction of movement of said closure member to move out of holding relation with said closure member, a stop member for preventing swivel movement of said lever member at pressures below a predetermined pressure, said stop member normally engaging said lever member with disengagement therebetween being effected upon pivotal movement of said lever member in one direction through a predetermined angle, and a spring under tension having one end attached to said lever member and acting to pivot said lever member in the opposite direction to hold said closure member in closed position and also acting to swivel said lever member.

13. A pressure relief device comprising, means having an opening for relief of pressure, a movable closure member for said opening and against which pressure acts to move said closure member to an open position, movable force transmitting means engageable with said closure member and being movable out of engagement therewith, a single spring exerting a force acting on said force transmitting means to hold said closure member in closed position, said spring also being operable to move said force transmitting means out of holding engagement with said closure member so that said closure member can move to an open position, and means restraining movement of said force transmitting means by said spring out of holding engagement with said closure member at pressures below a predetermined pressure acting against said closure member.

14. A pressure relief device comprising, a wall having an opening for relief of pressure, a movable closure member for closing said opening, a lever member to transmit a force to hold said closure member in closed position and fulcrumed to pivot in the direction of movement of said closure member, said lever member also being arranged to swivel relative to and out of holding relation with said closure member, yieldable means exerting a force acting through said lever member to hold said closure member in closed position, yieldable means exerting a force acting to swivel said lever member, and means to prevent swivel movement of said lever member at pressures below a predetermined pressure.

15. In a device of the character described, a casing having a pressure chamber, a pressure operated member movable by pressure in said chamber, an arm member secured at one end to said casing and having a portion abutting said pressure operated member, said arm member portion being laterally movable out of abutment with said pressure operated member, means acting on said arm member and exerting a force to move said arm member laterally and also to hold said arm member portion in abutment with said pressure operated member, and means opposing lateral movement of said arm member.

16. In a device of the character described, a pressure chamber, means movable by pressure in said chamber, swingable means in the path of movement of said means and movable therefrom, means acting to move said second means out of said path and determining the pressure in said chamber to move said first means, and means holding said second means in said path for a predetermined extent of movement of said first means.

17. In a relief valve of the character described, a casing having a passageway therethrough including a valve port, frangible means closing said port to flow of fluid, means reenforcing said frangible means and movable relative thereto, fulcrum means secured to said casing and rotatable in a plane parallel to the plane of said port, lever means rotatably secured to said fulcrum means for movement in a plane perpendicular to the plane of said port, said lever means being operable to urge said reenforcing means toward reenforcing position and being movable with said fulcrum means to release said reenforcing means, means having a force component to urge said fulcrum means in its rotational movement and having a second force component to urge said lever means in its rotational movement to urge said reenforcing means toward said position, means limiting movement of said reenforcing means toward said position, and means cooperating with said fulcrum means to limit releasing rotation of said fulcrum means to maintain said reenforcing means in reenforcing position below a predetermined pressure in said passageway acting against said frangible means.

ADOLF VON WANGENHEIM.